United States Patent Office 3,537,310
Patented Nov. 3, 1970

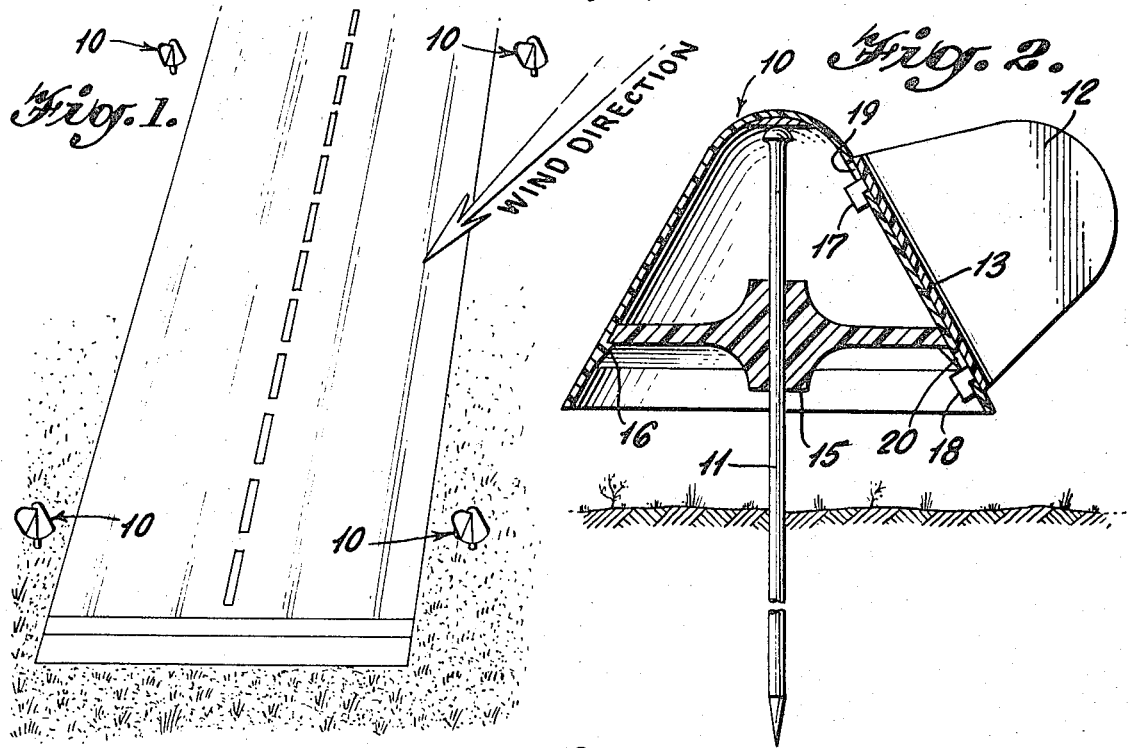
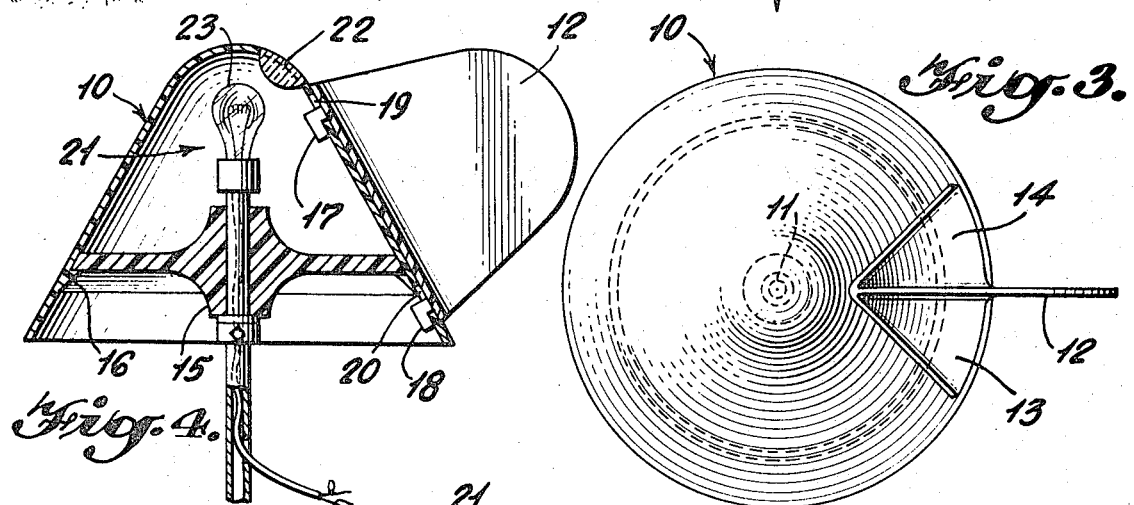
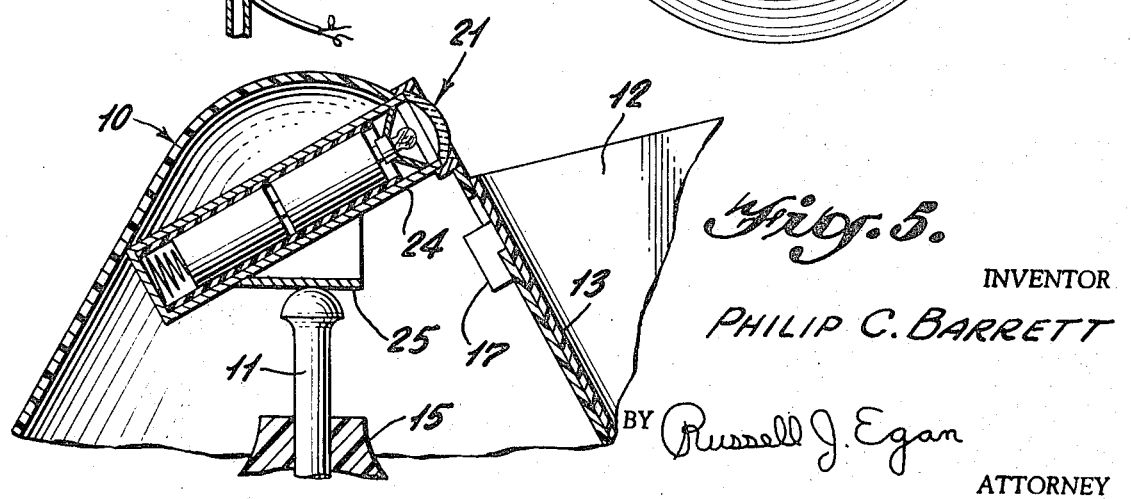

3,537,310
WIND DIRECTION INDICATING RUNWAY MARKER
Philip Claud Barrett, 8100 Valleyview Drive, El Paso, Tex. 79907
Filed July 15, 1968, Ser. No. 744,969
Int. Cl. G01p *13/02*
U.S. Cl. 73—188     4 Claims

ABSTRACT OF THE DISCLOSURE

A runway marker to indicate wind direction having a radial vane to cause the marker to rotate according to the wind direction. The marker selectively includes, in combination, reflective panels on either side of the vane and/or a light source closely adjacent the vane so that wind direction may be observed under any light condition.

---

There presently is a need for an inexpensive runway marker which will indicate wind direction on the runway for landing aircraft. The familiar wind sock has the major disadvantage of indicating wind direction at only one location, such as the hanger area, which will not necessarily be the wind direction on the runways where the aircraft are actually landing. Such a marker should be freely rotatable according to wind direction and be able to clearly indicate the direction of the wind for both daytime and nighttime landings. There would be special application for such markers for use in heliports which are usually rather small in size and where wind direction information is essential for landing helicoptors.

It is therefore an object of the present invention to provide a wind direction indicating runway marker which may be readily and economically produced.

It is a further object of the present invention to provide a runway marker which will indicate wind direction for both daytime and nighttime landings.

It is another object of the present invention to provide a portable runway marker having a battery operated light source for use in temporary locations.

It is a further object of the invention to provide a runway marker which may be set up in a permanent location and take its power from installed line current.

The means for accomplishing the foregoing objects and other advantages, which will be apparent to those skilled in the art, are set forth in the following specification and claims and are illustrated in the accompanying drawings dealing with a basic embodiment of the present invention. Reference is made now to the drawings in which:

FIG. 1 is a perspective view of a runway showing several of the inventive markers as they would be installed;

FIG. 2 is a vertical section through one embodiment of the invention showing the principle portions thereof;

FIG. 3 is a plan view of the embodiment of the invention shown in FIG. 2;

FIG. 4 is a vertical section through another embodiment of the present invention showing the illumination means; and FIG. 5 is a vertical section through yet another embodiment showing a portable and replaceable light source.

Turning now to the drawings it will be noted that the inventive runway marker generally comprises a dome-shaped member 10 mounted on a shaft 11 and provided with a wind direction vane 12. Closely adjacent to either side of the vane are reflective panels 13 and 14. The dome is freely rotatably mounted on the shaft 11 by means of a bearing 15. The bearing may be either a solid disc or spoked with the periphery of the disc or ends of the spokes lockingly engaging with an integral lip 16 on the inside of member 10. The vane may be mounted on the dome by any convenient means including rivets and bolts or the hooks 17 and 18 shown extending through slots 19 and 20.

The illuminated embodiments of the invention contain a luminous light source 21 and clear lens 22. The lens is positioned in substantially radial alignment with and adjacent to the vane to give a directional indication of the wind by either or both illuminating the fin and sending out a light beam. The light source 21 may be a conventional incandescent lamp 23 hooked to a conventional power supply for normal runway lighting (as shown in FIG. 4) or it may be portable battery operated light such as a flashlight 24 shown mounted in a bracket 25 fixed in dome member 10 (as shown in FIG. 4).

FIG. 3 is a top plan view showing the relationship of the reflective panels to the vane. These panels may be either painted, adhered or formed directly on the dome member or may be integral with the vane, as shown, to support the vane in a substantially radial position. Some recently developed reflective tapes would obviate the light source since they would reflect enough light from the landing lights on the aircraft to give a clear indication of wind direction.

FIG. 1 shows how the inventive markers would be situated along a runway. As an aircraft approaches the runway the pilot will note the direction of the vane or, if light conditions do not allow for clear sighting of the vane, the amount of the reflective panels visable or the light beam and will appropriately alter the direction of the aircraft to compensate for wind direction.

The invention may be constructed of any light weight, inexpensive material such as polyethylene preferably of a color which will stand out from its surroundings. Of course the marker may be embodied in other alternate forms such as being provided with a float and anchoring means for use on lakes and the like for landings by float equipped aircraft. Also the marker could be equipped with a shock absorbing, fairly heavy base so that it could be dropped from an aircraft on a first pass over an unknown landing area. Further the reflective panels could be formed of translucent or transparent material integral with the dome member so that the light source may be directly observed at the indicating quadrant.

The invention may be embodied in other specific forms without departing from the spirit or essential characteristics thereof. The present embodiment is therefore to be considered in all respects as illustrative and not restrictive, the scope of the invention being indicated by the appended claims rather than the foregoing description, and all changes which come within the means and range of equivalency of the claims are therefore to be embraced therein.

I claim:
1. A wind direction indicating runway marker comprising a substantially vertical fixed support means, a conically-shaped dome member having a rounded apex and freely rotatably mounted on said support means, single vane means fixedly mounted on the exterior of said dome means and extending radially of said support means, reflective means mounted on the exterior of said dome means adjacent to both sides of said vane means which will obscure view of at least part of one of said reflective means when viewing said marker at an angle with respect to said vane means.
2. A wind direction indicating runway marker according to claim 1 further comprising illuminating means arranged to light said vane means.
3. A runway marker according to claim 2 wherein said illuminating means comprises a light source mounted in- side of said dome and a clear lens mounted in said dome adjacent to and in substantial alignment with said vane means.

4. A runway marker according to claim 2 wherein said illuminating means comprises a self-contained light source, bracket means fixedly attached in said dome means to receive said self-contained light source in substantially axial alignment with said vane means.

References Cited

UNITED STATES PATENTS

| 1,422,922 | 7/1922 | Cameron | 73—188 |
| 1,605,086 | 11/1926 | Watson | 73—188 |
| 1,942,039 | 1/1934 | Tyler | 73—188 |

JERRY W. MYRACLE, Primary Examiner